July 22, 1952 S. E. SEFTON 2,604,064
WIRE SOLDER FEEDER FOR SOLDERING IRONS
Filed Oct. 13, 1948 2 SHEETS—SHEET 1
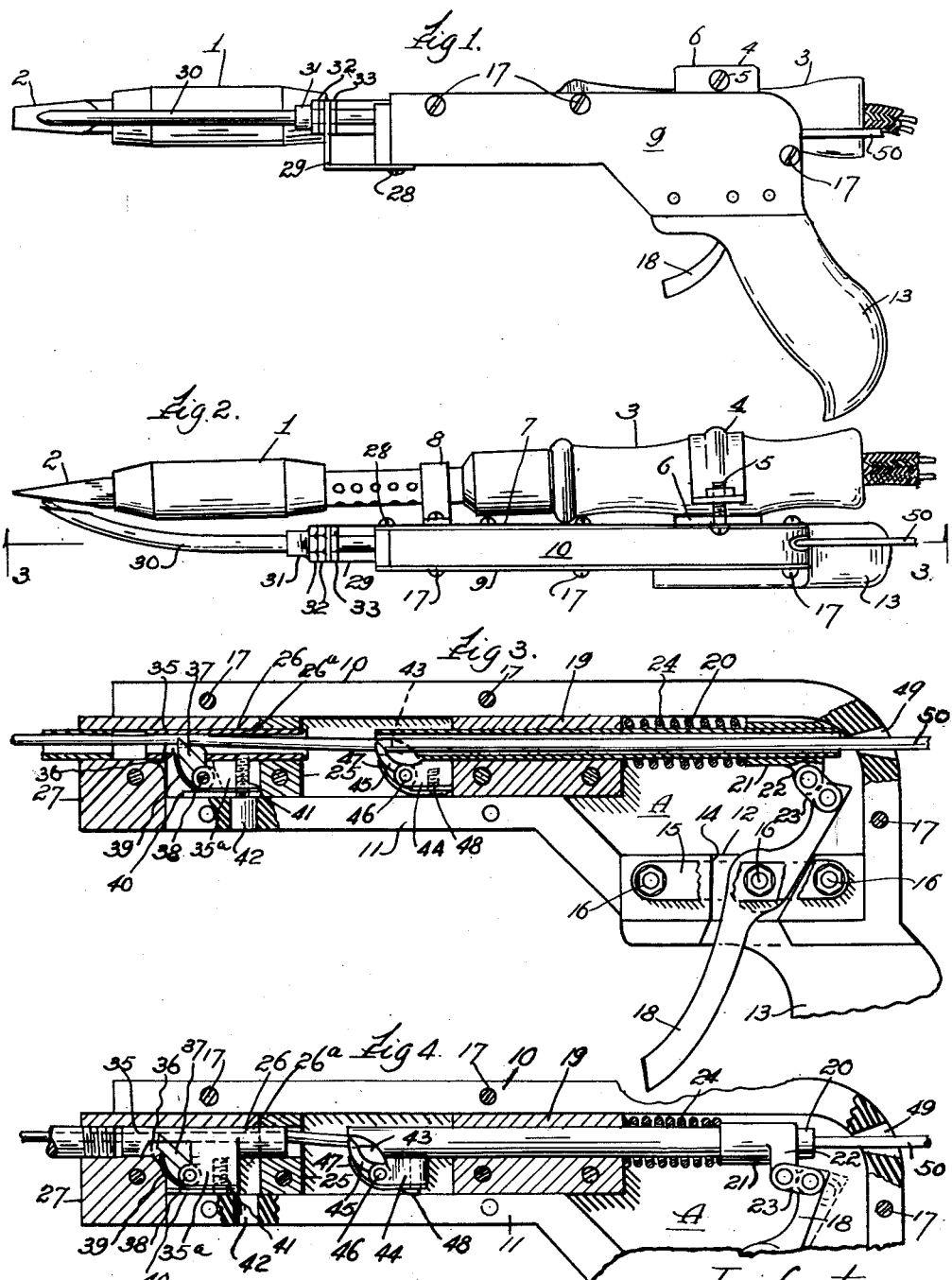
Inventor,
Samuel E. Sefton,
by H. J. Sanders
Attorney.

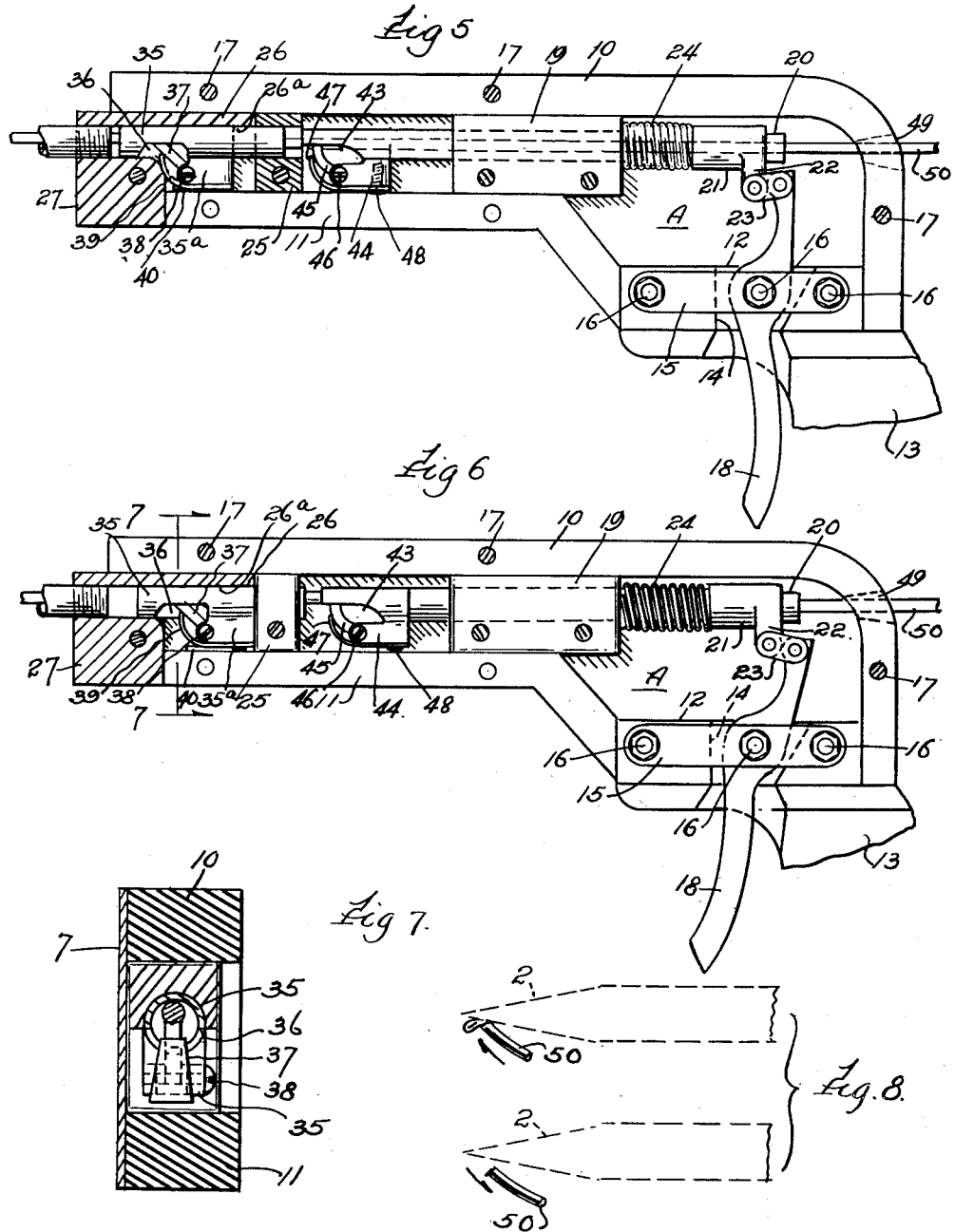

Patented July 22, 1952

2,604,064

UNITED STATES PATENT OFFICE 2,604,064

WIRE SOLDER FEEDER FOR SOLDERING IRONS

Samuel E. Sefton, Chicago, Ill.

Application October 13, 1948, Serial No. 54,245

2 Claims. (Cl. 113—109)

This invention relates to soldering irons and more particularly to means for feeding wire solder to the tip of the iron. One object is to provide a solder feeding mechanism adapted to be attached to any conventional soldering iron without altering its construction. A further object is to provide a self-feeding attachment for soldering irons that is of light weight and readily operated by one hand leaving the operator's other hand entirely free.

A still further object is to provide a wire-solder feeder for soldering irons that is very economical in the use of solder, means being provided for retracting the solder, after each heating of the end thereof, away from the iron tip to prevent melting too great a portion of the solder for one operation which would result in waste of material.

A further object is to provide a self-feeding attachment for soldering irons that is gun shaped for easy grasp and manipulation by the operator, that is quite simple in construction, of few parts, durable in use and one wherein all parts are so located as to be readily accessible for inspection, repair or replacement when necessary and that is inexpensive to manufacture and compact in assembly.

My invention resides in the combination and arrangement of parts and in the details of construction described in the specification, a preferred embodiment being illustrated in the drawings and particularly pointed out in the claims. It is understood that I do not limit myself to the precise showing of the invention herein made as various changes may be resorted to within the scope of what is claimed and without departing from the spirit of the invention. I intend no limitations other than those imposed by the claims.

In the drawings:

Fig. 1 is a view in side elevation of the instant feeder attached to a soldering iron.

Fig. 2 is a top plan view of Fig. 1.

Fig. 3 is a longitudinal sectional view through Fig. 2 on the line 3—3 looking in the direction of the arrows.

Fig. 4 is a fragmentary view similar to Fig. 3, partly in section and partly in elevation, with movable parts in a position denoting the first step in a solder feeding movement.

Fig. 5 is a view similar to Fig. 4 but showing the movable parts in position denoting the finish of the forward feeding movement.

Fig. 6 is a view similar to Fig. 5 with the parts retracted at which time the solder has been heated and withdrawn from contiguity with the iron tip.

Fig. 7 is an enlarged vertical cross sectional view through Fig. 6 on the line 7—7, and, Fig. 8 is a diagrammatic view illustrating the position of the solder during and immediately after heating.

The reference numeral 1 denotes a soldering iron having the tip 2 and handle 3. Secured to the handle 3 by the metallic strap 4 and screws 5 is the spacer block 6 of metal or other suitable material which block is secured to one cover plate 7 of the attachment, said cover plate also secured by a strap 8 to the soldering iron. A second cover plate 9 is spaced from the cover plate 7 by a long upper peripheral wall 10 and a relatively short lower peripheral wall 11, the lower terminals of said walls spaced apart by an insert block 12 integral with a handle 13 extending downwardly and rearwardly slightly, said block 12 formed with a socket 14 opening at 14a through the handle. The side walls of the block 12 each have secured thereto a metal strap 15 which straps bridge the socket 14 upon its sides, said straps being secured by bolts 16 to the block 12 and to the cover plates 7, 9 which plates are secured to the peripheral walls by the fastening means 17 also. One bolt 16 passing through the socket 14 serves as a fulcrum for the trigger 18 that extends through the aligned sockets 14, 14a for manipulation by the operator and terminates within the chamber A formed by the cover plates and peripheral walls. The chamber A is elongated or barrel-shaped throughout its forward portion and relatively wide at its rear portion, the general outline or apearance of the attachment so far described being pistol or gun-shaped.

Arranged at the juncture of the wide and narrow portions of the chamber A and there made fast is the oblong perforate block 19 through and beyond which the tubular plunger 20 extends, the rear end of said plunger having fast thereupon a collar 21 having ears 22 pivotally connected to the aforesaid trigger 18 by link 23, the extreme rear end of plunger 20 contiguous to the peripheral wall 10 in the normal position of the plunger. A coil spring 24 about the plunger abuts the block 19 and collar 21 to yieldingly retain the plunger in normal retracted position. Spaced materially from the block 19 within the forward or barrel end of the chamber A is the relatively small guide block 25 and contiguous to said guide block is the rearwardly extending arm 26 of the support block 27, the free end of said arm contiguous to guide block 25 and to the peripheral wall 10, a material space being formed between the arm 26 and peripheral wall 11, and between the block 27 and guide block 25 which space, however, is somewhat less than that between the blocks 25 and 19.

Secured to the base of support block 27 by screw 28 is the angular bracket 29 having one upturned end spaced from and substantially parallel to the forward face of said support block and perforated in line with perforations in that block and in blocks 25 and 19 and in line with an elongated recess 26a in the arm 26. Threaded at its inner end for engagement with the interiorly threaded perforation in the support block is the transmission tube 30 curved at its free and slightly to permit contiguity to the iron tip 2, said tube 30 extending through the bracket perforation and carrying an exteriorly threaded collar 31 upon which contiguous to said bracket are the two lock nuts 32 and upon the opposite side of said bracket the nut 33, said collar serving as a guide for the tube while so engaging same as to yieldingly permit longitudinal tube movement when the threaded end of the tube is disengaged from the block 27 as may be desired when a broken tube is to be replaced.

A floating slide sleeve 35 has its body portion received in the elongated recess in arm 26 and its ends telescopically engaging the blocks 25, 27, its rear end adapted to abut against the block 25 in one sleeve position as shown in Fig. 6, the sleeve body portion formed with an extension 35a having an elongated slot 36 to receive the terminally recessed detent 37 pivotally supported upon pin 38 carried by sleeve extension 35a, said detent engaged by a curved spring support 39 disposed between a foot 40 and the sleeve extension 35a, said members secured together by a headless screw 41 which is accessible for application to or removal from position by removal of the plug 42, having a recess in one end, carried by the peripheral wall 11; said spring support 39 in one position of the sleeve 35, clearly shown in Figs. 4 and 5, abutting against the said support block 27.

Referring again to the aforesaid plunger 20 same is formed at its forward end with a slot 43 and between same and the block 19 the plunger is formed with an integral extension 44 normally abutting against said block to which extension an arcuate detent 45 is pivotally connected by pin 46, a partially rearwardly curved spring 47 secured by screw 48 to said extension engaging said detent to yieldingly urge same upwardly. The contour of detents 37, 45 is similar and the strength of the springs 39, 47 desirably equal. The peripheral wall 19 is formed in its rear portion with a flared perforation 49 to permit manual introduction of the wire solder 50 which is moved forwardly through the tubular plunger 20 and outwardly at the forward end thereof in frictional engagement with the detent 45, into and through the sliding sleeve 35 frictionally engaging the detent 37 and into the transmission tube and out and into contiguity with the iron tip 2. Before the operating mechanism can function the wire solder must be manually urged into and through the attachment forwardly beyond the detent 37 and thereafter manual manipulation of the trigger in the manner of a pistol trigger will urge the solder intermittently forward while each release of the trigger will permit spring 24 to effect a slight retraction of the solder away from the iron tip 2, this reverse movement being positively halted after each predetermined reverse step by engagement of the sleeve extension 35a with the block 25.

When the trigger 18 is retracted by rearward pressure upon its free end in conventional manner by the first or trigger finger of the operator a forward movement is imparted to the plunger through link 23 and collar 21, the latter compressing the spring 24. At the same time the detent 45 retained in frictional engagement with the wire solder 50 by the spring support 47 propels the solder forwardly and moves the sleeve extension 44 out of abutting engagement with the block 19. The solder wire engaged by the detent 37 moves the extension 35a, sleeve 35 and foot 40 forwardly until foot 40 and spring support 39 ride into engagement with the support block 27 which block arrests their further forward movement positively. A continuing operative movement of the trigger now causes the detent 45 to urge the wire solder forwardly against the resistance of the detent 37 until the trigger completes its movement. When the trigger is now released by the operator the spring 24 returns it and the plunger 20 to normal position, the plunger also positively returning the extension 44 and detent 45; for a portion of the extent of this movement the detent 45 and spring 24 return the wire solder which being in frictional engagement with the detent 37 returns same and the floating sleeve until the foot 40 engages the guide block 25 which engagement positively stops the return or reverse movement of the foot and of the wire solder but the spring 24 is of sufficient strength to complete the independent return of the plunger 20 with extension 44, detent 45 and trigger to normal position. Thus the wire solder has made a forward movement through the tube 30 toward the iron tip 2 and immediately thereafter a relatively short return movement. This movement of the wire solder is repeated each time the trigger 18 is manually moved and released until the solder reaches contiguity with that tip and thereafter the solder position maintained as desired until the entire wire is moved forwardly and may no longer be engaged by the detent 45.

The net advance of the solder wire upon each forward and return trigger movement is the difference between the length of the arc described by the trigger inner end and the space between the guide block 25 and the foot 40 when the latter is in engagement with the support block 27. When it may be desired to clean the tip of the soldering iron the tube 30 may be manually moved in a rotary manner to dispose its free end away from that tip in material spaced relation thereto.

What is claimed is:

1. In a solder wire feeder for soldering irons, a housing for attachment to a soldering iron, a perforate block in said housing, a plunger in said housing extending through said block freely receiving the solder wire, a trigger for actuating said plunger, spring means yieldingly retaining said plunger in its rearward position, a guide block in said housing in line with and spaced from said perforate block, a spring actuated detent carried by said plunger between said guide block and said perforate block engaging the solder wire, a slide sleeve operable in said guide block receiving the solder wire from said plunger, a support block carried by said housing in the path of said detent and spaced forwardly from said guide block, an extension for said slide sleeve abutting said guide block on its rearward travel and abutting said support block on its forward travel, a spring actuated detent carried by said extension engaging the solder wire, the space between said support block and guide block being less than that between said guide block and perforate block, a foot fast to said extension engaging said guide block at a predetermined point in the travel of said extension rearwardly positively arresting the movement of said extension and the solder wire, and a transmission tube operatively supported by said housing in line with said sliding sleeve bent into contiguity with the iron tip and receiving the solder wire from said sleeve.

2. In a solder wire feeder for soldering irons, a housing for attachment to a soldering iron, a perforate block in said housing, a plunger carried by said perforate block receiving the solder wire, a collar fast to one end of said plunger spaced from said perforate block, a trigger connected to said collar for actuating said plunger, spring means yieldingly retaining said plunger in its rearward position, a guide block in said housing spaced from said perforate block, wire feeding and retracting means carried by said plunger between said perforate block and said guide block operative by the forward and return movement of said plunger, a sleeved support block carried by said housing with its body portion spaced forwardly from said guide block, the space between said support block and said guide block being less than that between said guide block and said perforate block, a floating slide sleeve operatively received in said support block and sleeve and receiving the solder wire from said plunger, spring pressed detent wire gripping means carried by said floating slide sleeve in the space between said guide block and said support block, said spring pressed detent wire gripping means engaging said support block at a point in its forward movement, said spring pressed detent wire gripping means engaging said guide block at a point in its rearward movement.

SAMUEL E. SEFTON.

REFERENCES CITED

The following references are of record in the file of this patent:

UNITED STATES PATENTS

| Number | Name | Date |
|---|---|---|
| Re. 21,991 | Walker | Dec. 30, 1941 |
| 961,743 | Ayars | June 14, 1910 |
| 1,631,063 | Rognley | May 31, 1927 |
| 1,749,512 | Schylander | Mar. 4, 1930 |
| 2,093,527 | Petti | Sept. 21, 1937 |
| 2,119,462 | Kull | May 31, 1938 |
| 2,291,065 | Walker | July 28, 1942 |
| 2,396,799 | McCully | Mar. 19, 1946 |
| 2,433,514 | Hughey | Dec. 30, 1947 |
| 2,444,267 | Pereira | June 29, 1948 |